(12) United States Patent
Escobar et al.

(10) Patent No.: US 12,223,461 B2
(45) Date of Patent: Feb. 11, 2025

(54) DEVICES FOR PORTABLE ENVIRONMENT CONTROLLED CONTAINERS

(71) Applicant: PAVEL & SPRAUVE LLC, Walnut Creek, CA (US)

(72) Inventors: Steven S. Escobar, San Jose, CA (US); Michael Sprauve, San Jose, CA (US); Michael Pavel, Walnut Creek, CA (US)

(73) Assignee: PAVEL & SPRAUVE LLC, Walnut Creek, CA (US)

( * ) Notice: Subject to any disclaimer, the term of this patent is extended or adjusted under 35 U.S.C. 154(b) by 0 days.

(21) Appl. No.: 18/475,836

(22) Filed: Sep. 27, 2023

(65) Prior Publication Data

US 2024/0086822 A1   Mar. 14, 2024

Related U.S. Application Data

(63) Continuation of application No. 17/854,949, filed on Jun. 30, 2022, now Pat. No. 11,810,046, which is a continuation of application No. 17/393,445, filed on Aug. 4, 2021, now Pat. No. 11,449,818.

(60) Provisional application No. 63/062,525, filed on Aug. 7, 2020.

(51) Int. Cl.
| | |
|---|---|
| *G06Q 10/083* | (2023.01) |
| *G01P 15/08* | (2006.01) |
| *G01S 19/05* | (2010.01) |
| *G06Q 50/12* | (2012.01) |
| *H04W 4/029* | (2018.01) |

(52) U.S. Cl.
CPC ............ *G06Q 10/083* (2013.01); *G01P 15/08* (2013.01); *G01S 19/05* (2013.01); *G06Q 50/12* (2013.01); *H04W 4/029* (2018.02)

(58) Field of Classification Search
CPC ...... G06Q 10/083; G06Q 50/12; G01P 15/08; G01S 19/05
See application file for complete search history.

(56) References Cited

U.S. PATENT DOCUMENTS

| | | | |
|---|---|---|---|
| 6,281,477 B1 | 8/2001 | Forrester et al. | |
| 6,297,481 B1 | 10/2001 | Gordon | |
| 6,353,208 B1 | 3/2002 | Bostic et al. | |
| 8,168,923 B2 | 5/2012 | Wong et al. | |
| 9,492,035 B2 | 11/2016 | Pavel et al. | |
| 10,049,236 B1 | 8/2018 | Alkarmi et al. | |
| 10,207,804 B1 | 2/2019 | Gentry | |
| 10,321,263 B1 | 6/2019 | Alkarmi et al. | |
| 11,449,818 B2 * | 9/2022 | Escobar | ................ G01P 15/08 |
| 11,810,046 B2 * | 11/2023 | Escobar | ................ H04W 4/029 |
| 2015/0374177 A1 | 12/2015 | Pavel et al. | |
| 2017/0265687 A1 | 9/2017 | Veltrop et al. | |

(Continued)

FOREIGN PATENT DOCUMENTS

| | | |
|---|---|---|
| CN | 203723974 U | 7/2014 |
| EP | 1580145 A1 | 9/2005 |

(Continued)

*Primary Examiner* — Myron Wyche

(74) *Attorney, Agent, or Firm* — Fishman Stewart PLLC; Cecily Anne O'Regan

(57) ABSTRACT

Disclosed are portable containers for delivering food products from a central location to a remote location. More specifically, the disclosure relates to portable containers for delivering food products operable to maintain an environment for the food product during the delivery process.

14 Claims, 6 Drawing Sheets

(56) References Cited

U.S. PATENT DOCUMENTS

| | | |
|---|---|---|
| 2018/0061207 A1 | 3/2018 | Nygren et al. |
| 2019/0112119 A1 | 4/2019 | Alexander et al. |
| 2019/0337706 A1 | 11/2019 | Väin et al. |
| 2020/0051015 A1 | 2/2020 | Davis et al. |
| 2020/0229645 A1 | 7/2020 | Karsten et al. |
| 2022/0044188 A1 | 2/2022 | Escobar et al. |
| 2022/0405696 A1 | 12/2022 | Escobar et al. |

FOREIGN PATENT DOCUMENTS

| | | |
|---|---|---|
| GB | 2374918 A | 10/2002 |
| JP | 2009285130 A | 12/2009 |
| KR | 200360078 Y1 | 8/2004 |
| KR | 1020060000472 A | 1/2006 |
| KR | 20110011575 A | 2/2011 |
| KR | 101696652 B1 | 2/2017 |
| KR | 1020200074547 A | 6/2020 |
| WO | 1995020535 A1 | 8/1995 |
| WO | 2018092477 | 5/2018 |
| WO | 2020037370 A1 | 2/2020 |
| WO | 2020046385 A1 | 3/2020 |
| WO | 2022031897 A1 | 2/2022 |
| WO | 2024168204 A1 | 8/2024 |

\* cited by examiner

DEVICES FOR PORTABLE ENVIRONMENT CONTROLLED CONTAINERS

CROSS-REFERENCE

This application claims priority to U.S. patent application Ser. No. 17/854,949 filed Jun. 30, 2023, which claims priority to Ser. No. 17/393,445 filed Aug. 4, 2021, now U.S. Pat. No. 11,449,818, which claims the benefit of U.S. Provisional Application No. 63/062,525, filed Aug. 7, 2020, entitled Methods, Systems and Devices for Portable Environment Controlled Container, which applications are incorporated herein in their entirety by reference.

BACKGROUND

Field

The disclosure relates to portable containers for delivering food products from a central location to a remote location. More specifically, the disclosure relates to portable containers for delivering food products operable to maintain an environment for the food product during the delivery process.

Background

The United States does nearly $50B (USD) per year in restaurant food delivery. This number is projected to reach over $90B per year in the United States and over $160B per year globally by 2023. With the global pandemic COVID-19 in 2019, an even faster growth in the food delivery space is likely.

As the rate of food delivery increases, the expectation for quality and taste by the consumer will also increase. Effort are being made to improve the quality of the delivered food at the delivery destination to match, or substantially match, the quality of the food at the creation location. Current solutions focus on maintaining the heat of the to-be-delivered food. However, heat alone does not overcome the degradation in the quality of food during the delivery process.

What is needed are methods, systems and devices for portable environment-controlled containers suitable for food delivery which enable delivered food to maintain the quality and experience of the in-restaurant experience.

SUMMARY

Disclosed are methods, systems and devices for portable environment-controlled containers suitable for food delivery which enable delivered food to maintain the quality and experience of the in-restaurant experience. The systems and devices are configurable to control a plurality of environmental factors to facilitate the maintenance of the food temperature and humidity. What is also needed are methods, systems and devices for monitoring an environmental condition and reporting a change in condition which does not require opening the container. What is also needed are tools to customize the environmental conditions based on the type of food being transported.

Disclosed are portable containers. Suitable portable containers comprise: an enclosure having an openable section, the openable section operable to move from an open position, for receiving a container, and a closed position; an environmental control module interface surface incorporated into a surface of the portable container; an environmental control module operable to engage the environmental control module interface surface; one or more environmental controllers; one or more environmental sensors; and a power supply, wherein the environmental control module is operable to communicate one or more sensed environmental conditions and to adjust one or more environmental controllers. The containers and/or enclosures have a three-dimensional shape selected from a cube, a cuboid, a pyramid, a cone, a triangular prism, and a cylinder. The one or more environmental sensors are selected from temperature sensors, moisture sensors, humidity sensors, atmospheric pressure sensors, oxygen sensors, air quality sensors, smoke sensors. Additionally, more than one of any of the environmental sensors can be provided. In some configurations, the one or more environmental sensors positioned within the environmental controller. Further, the one or more environmental sensors positioned within the portable container at a location away from the environmental controller. A GPS sensor can also be provided in some embodiments. A communication device can also be provided for transmitting information from one or more sensors and receiving environment control instructions in response to the transmitted sensor information. One or more of a GPS sensor and a G-force sensor can also be provided.

Another embodiment is directed to transportation methods comprising: providing a portable container having an enclosure having an openable section, the openable section operable to move from an open position, for receiving a food container, and a closed position, an environmental control module interface surface incorporated into a surface of the portable container, an environmental control module operable to engage the environmental control module interface surface, one or more environmental controllers, one or more environmental sensors, and a power supply, wherein the environmental control module is operable to communicate one or more sensed environmental conditions and to adjust one or more environmental controllers; opening the portable container; placing the food container within the portable container for transport; closing the portable container; configuring the environmental control module to maintain an environment within the container based on an identification of food within the food container; and transporting the portable container. The methods can also comprise one or more of determining a GPS location for the portable container, determining a G-force for the portable container, determining if the portable container has maintained one or more environmental conditions during transport, and if the portable container has maintained the one or more environmental conditions, delivering the food container, determining if the portable container has been subjected to any G-force during transport, and if the portable container has not been subjected to any G-force, delivering the food container, and determining if the portable container has been subjected to any G-force during transport, and if the portable container has been subjected to any G-force, determining whether the G-force is within a predetermined range of allowable G-force, and if the G-force is within the predetermined range of allowable G-force, delivering the food container.

Still another aspect of the disclosure is directed to a system comprising: memory; one or more processors; and one or more computer-executable instructions stored in the memory and executable by the one or more processors to perform operations comprising: receiving, via a mobile application associated with a service provider on a device, a current geographic location of the device; receiving, via the mobile application associated with the service provider on the device, one or more environmental conditions; determining if the portable container has maintained one or more environmental conditions within an environmental condition range during transport, and if the portable container has maintained the one or more environmental conditions, delivering food container located within the portable container; displaying, via the mobile application, instructions to deliver the food container if the environmental conditions have been maintained. Additionally the system can be operable to determine if the portable container has been subjected to any G-force during transport, and if the portable container has not been subjected to any G-force, delivering the food container and/or determine if the portable container has been subjected to any G-force during transport, and if the portable container has been subjected to any G-force, determining whether the G-force is within a predetermined range of allowable G-force, and if the G-force is within the predetermined range of allowable G-force, delivering the food container.

INCORPORATION BY REFERENCE

All publications, patents, and patent applications mentioned in this specification are herein incorporated by reference to the same extent as if each individual publication, patent, or patent application was specifically and individually indicated to be incorporated by reference:
U.S. Pat. No. 6,281,477B1 by Forrester et al. published Aug. 28, 2001;
U.S. Pat. No. 6,297,481B1 by Gordon published Oct. 2, 2001;
U.S. Pat. No. 6,353,208B1 by Bostic et al. published Mar. 5, 2002;
U.S. Pat. No. 8,168,923B2 by Wong et al. published May 1, 2012;
U.S. Pat. No. 9,492,035 by Pavel et al. published Nov. 15, 2016;
U.S. Pat. No. 10,049,236B1 by Alkarmi et al. published Aug. 14, 2018;
U.S. Pat. No. 10,207,804B1 by Gentry published Feb. 19, 2019;
U.S. Pat. No. 10,321,263B1 by Alkarmi et al. published Jun. 11, 2019;
US 2015/0374177 A1 by Pavel et al. published Dec. 31, 2015;
US 2017/0265687A1 by Veltrop et al. published Sep. 21, 2017;
US 2019/0112119A1 by Alexander et al. published Apr. 18, 2019;
US 2019/0337706A1 by Vain et al. published Nov. 7, 2019;
CN 203723974U published Jul. 23, 2014;
EP 1580145A1 by Martini published Sep. 28, 2005;
JP 2009285130A by Ito et al. published Dec. 10, 2009;
KR 20110011575A published Feb. 8, 2011;
WO 1995/020535A1 by Ghirardi published Aug. 3, 1995;
WO 2020/037370A1 by Valance published Feb. 27, 2020;
WO 2020/046385A1 by Pointer et al. published Mar. 5, 2020; and
Labuza et al., Moisture Migration and Control in Multi-Domain Foods, *Trends in Food Science & Tech,* 9(2): 47-55 (1998).

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

I. Devices

FIGS. 1A-F illustrate a mobile environmental control device 100 according to the disclosure. The environmental control device 100 is operable to house a container therein having an environmentally fragile content, such as a food item. As will be appreciated by those skilled in the art, humidity is a parameter that ovens, for example, have no control over. Humidity comprises water molecules and water molecules conduct heat much faster than air. Thus, humid air transfers heat more efficiently to food. During the cooking process, humidity can result in food cooking more quickly while also preventing water in the food from evaporating. An additional impact on temperature is air pressure. Temperature affects air pressure at different altitudes due to a disparity in air density. Thus the overall optimal environment can be impacted by a variety of different environmental conditions.

Figure 1A:
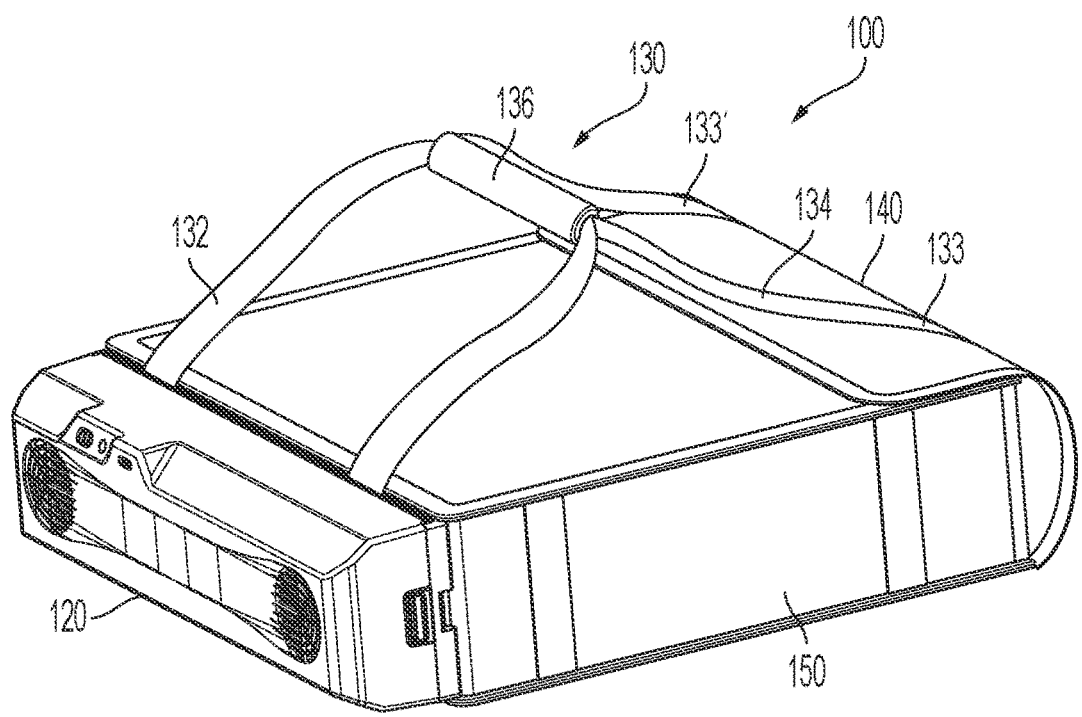
FIGS. 1A-F illustrate a mobile environmental control device.

FIG. 1A illustrates a perspective view of an exemplar mobile environment control device 100 from an end with a removable environmental controller 120. The container has a three dimensional shape defining an interior space into which an item for which environmental control is desired can be placed. As illustrated in FIG. 1, the environmental control device 100 has a top side, a bottom side, a right side, a left side, a rear side and a front side. The environment control device 100 is made from an insulating material. Moreover, the environment control device 100 can have a plurality of flexible or semi-flexible sides and an interface surface for engaging the environmental controller 120. One of the sides can be an opening side, allowing access to the interior of the environment control device 100.

The environmental control device 100 can be made of a material that allows the device to wick moisture from the inside of the enclosure to the outside of the enclosure. Moreover, the device can be comprised of one or more panels made from a substantially flexible material. In other configurations, the device can be made from one or more panels having a rigid or partially rigid shape (e.g. skeleton) to allow for stacking multiple devices.

The container can have a square or rectangular shape in a first dimension, e.g., along an upper surface having a handle 130 and a square or rectangular shape in a second dimension, e.g., along a side surface 150. A handle 130 can be provided operable to facilitate carrying the environmental control device 100 to facilitate optimal orientation of the environmental control device 100, for example, two straps 132, 134. As illustrated, each strap has two connection points, such as connection points 133, 133'. The connection points 133, 133' are located at or near each end of a side of the environment control device 100. As will be appreciated by those skilled in the art, the straps 132, 134 can connected on the sides 150, as illustrated, or along the opening side 140 and the opposing removable rear side 120 without departing from the scope of the disclosure. As illustrated, the rear side 120 engages the environmental controller 200. Additionally, a holder 136 can be provided which secures the two straps 132, 134 together. The holder 136 can be a separate holder element or can be incorporated into one of the straps to facilitate securing the straps together.

Because one side or location of the device may be heavier than another side, e.g., where the environmental controller is positioned, the handle can be offset to keep the device level notwithstanding any uneven weight.

The environmental controller 120 can be positioned on any surface of the control device 100 without departing from the scope of the disclosure.

The interior space or chamber can be sized to receive a plurality of containers, such as pizza boxes, and take-out food containers. As will be appreciated by those skilled in the art, the exemplar shape provided in the figures is one that is suitable for, for example, a pizza box. However, other shapes can be employed without departing from the scope of the disclosure. For example, three-dimensional shape can be selected from cube, cuboid, pyramid, cone, triangular prism, and cylinder Additionally, the location of the opening could, in some configurations, be positioned along the upper surface (where the handles are located in the illustrations) and the removable controller could also be positioned at another location without departing from the scope of the disclosure. One or more of the surfaces can be soft-sided. At least one surface, or a portion thereof, is configured to engage a removable environmental controller 200.

Figure 1B:
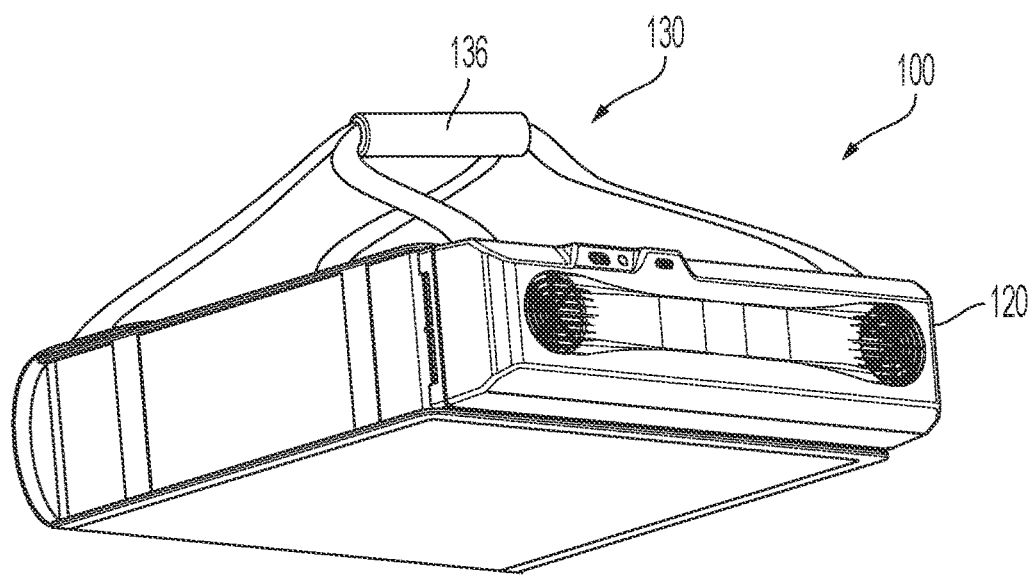
Figure 1C:
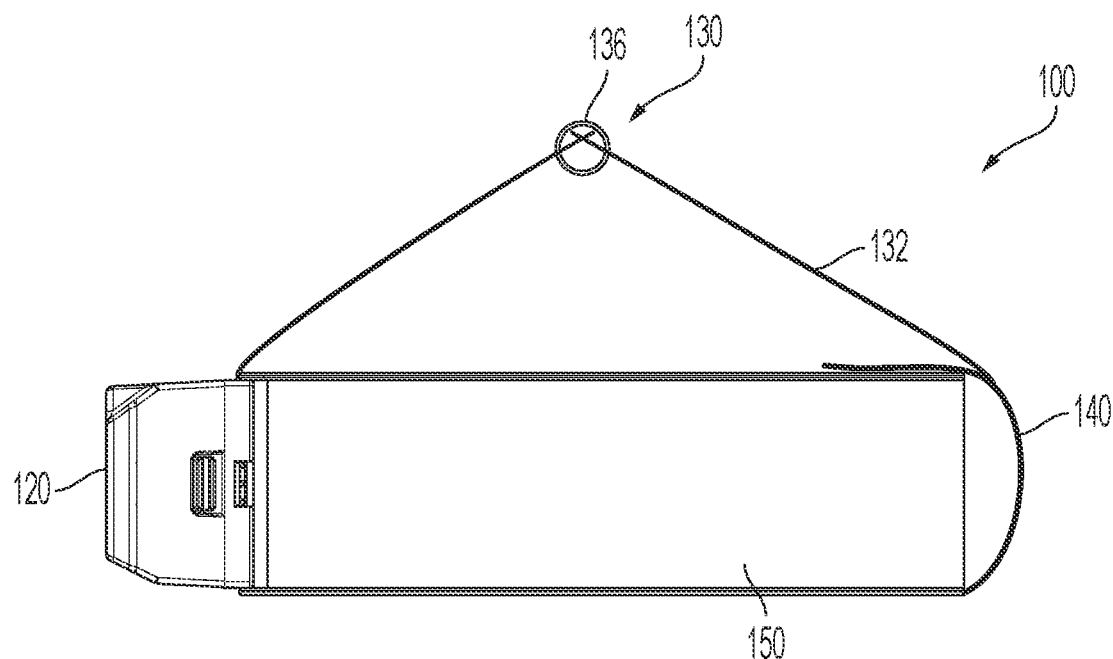
Figure 1D:
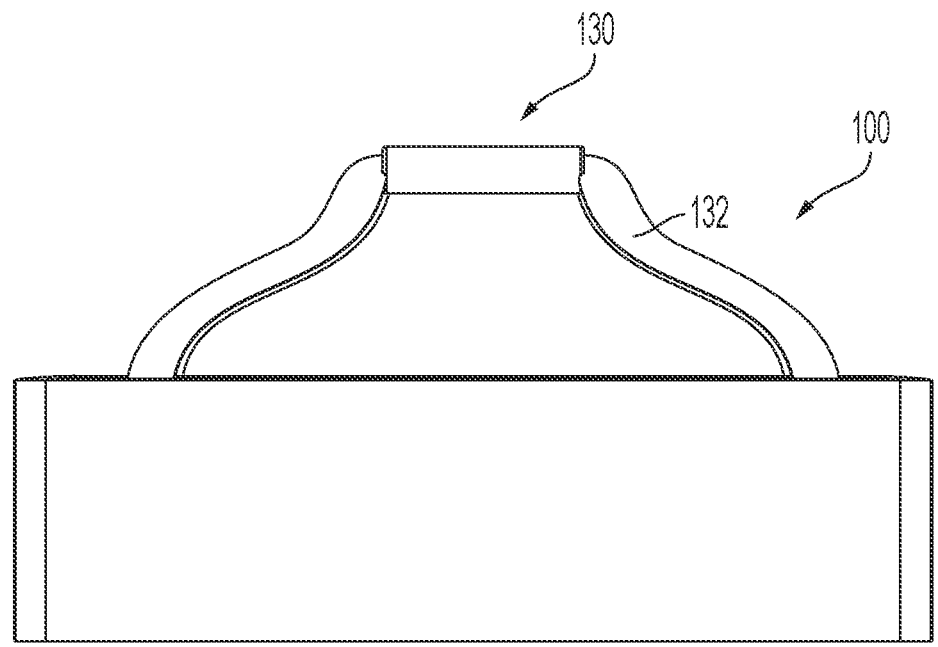
Figure 1E:
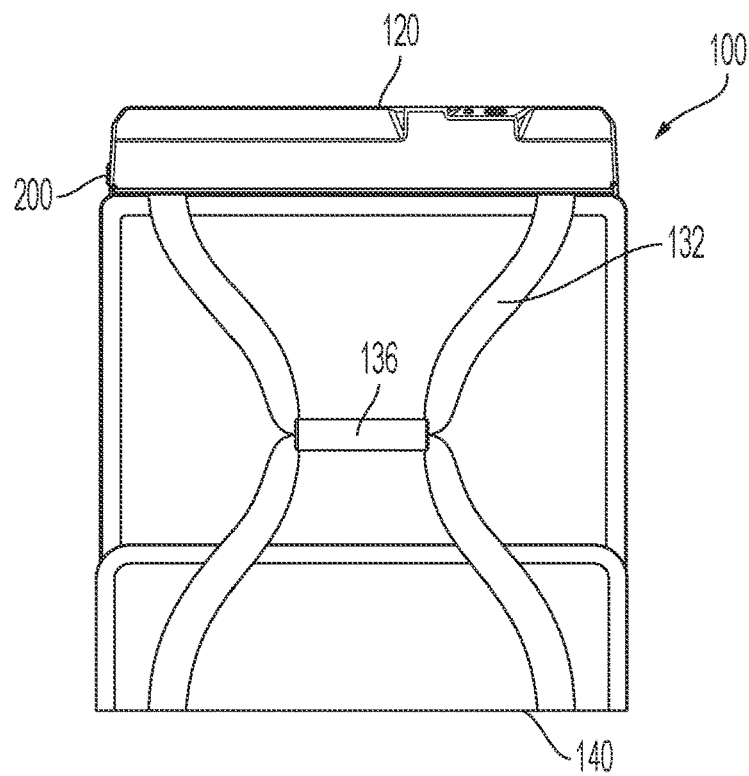
Figure 1F:
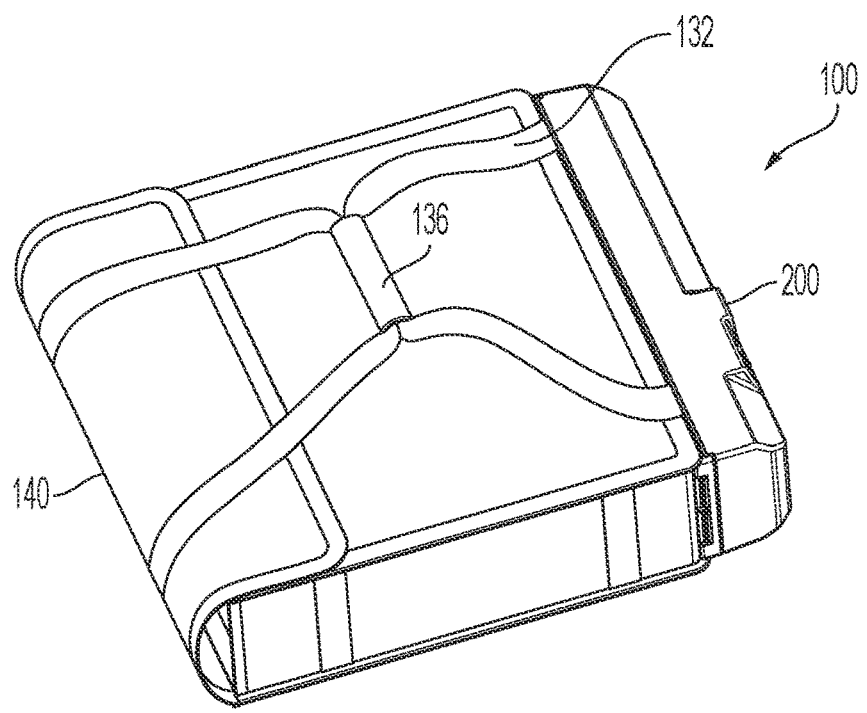

FIG. 1B illustrates the mobile environmental control device 100 from a bottom perspective view. FIG. 1C illustrates the mobile environmental control device 100 from a side view. FIG. 1D illustrates the mobile environmental control device 100 from a receiving side, e.g., when food is inserted into the device from a side entry, not a top entry. FIG. 1E illustrates the mobile environmental control device 100 from a top view, with two handles 130 secured together to facilitate carrying. Other locations for the handles could be employed, e.g., along the side for a back-pack type implementation, without departing from the scope of the disclosure. FIG. 1F is a perspective top view of the mobile environmental control device 100.

Figure 2A:
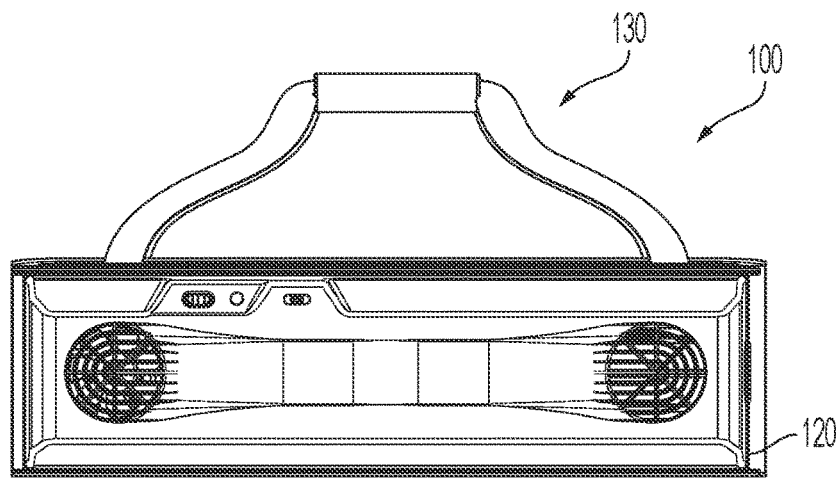
FIGS. 2A-F illustrate a mobile environmental control device.
Figure 2B:
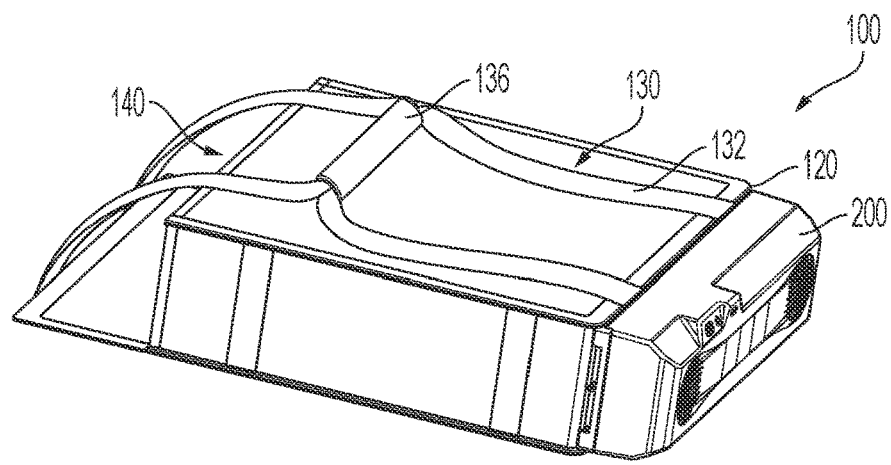

FIGS. 2A-F illustrate a mobile environmental control device 100. FIG. 2A is a removable environmental controller 200 end view of the mobile environmental control device 100. As illustrated, the removable environmental controller 200 encompasses an entire side of the mobile environmental control device 100. However, as will be appreciated by those skilled in the art, the dimension of the removable environmental controller 200 can be less than the overall dimensions of the surface of the mobile environmental control device 100 that the removable environmental controller 200 engages. FIG. 2B is a perspective view of the mobile environmental control device 100 with the receiving end open. The receiving end can be configured to have a foldable flap which allows the side to fold over and securely engage, for example, the top surface using a suitable securement device such as Velcro®. Other securement mechanisms can be used without departing from the scope of the disclosure including, for example, straps, snaps, and zipper closures. In another configuration, where the food is received through an upper surface, the upper surface can be configured to close like a lunch bag with the opening being folded upon itself to achieve closure. The two fans in the environmental controller are operable to circulate air throughout the interior of the device.

Figure 2C:
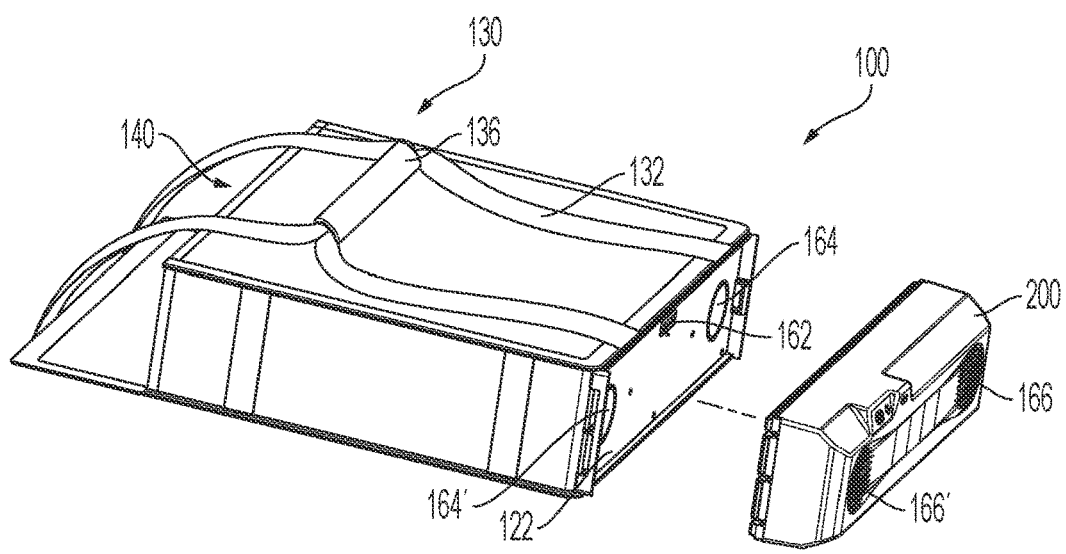

FIG. 2C is a perspective view of the mobile environmental control device 100 with the environmental controller removed from the device. An engagement surface 122 is provided or incorporated into the mobile environmental control device 100. The engagement surface 122 allows the functional components of the environmental controller 120 to engage the interior of the mobile environmental control device 100. Apertures can be provided in the engagement surface 122 which allow heat and/or moisture to pass from the environmental controller 200 to the interior of the mobile environmental control device 100. The engagement surface 122 can also include an environmental sensor 162, one or more heater inlets 164, 164', and one or more air outlets 168, 168'. The environmental controller 120 can include one or more fan inlets 166, 166' which correspond to a fan positioned within the environmental controller 120 and align with the position of the heater inlet 164, 164' on the engagement surface 122.

Figure 2D:
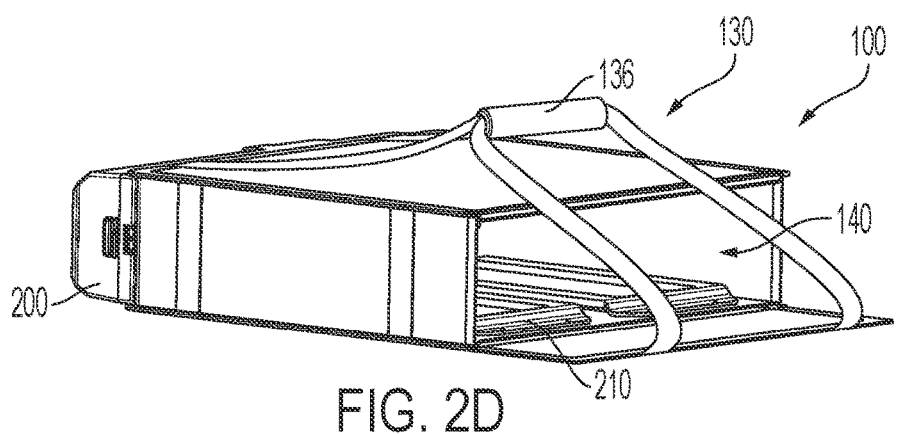

FIG. 2D illustrates a perspective view of the mobile environmental control device 100 with a receiving side open. The receiving side can be along a side of the environment control device 100 when it is placed on a flat surface, or on another side as described above.

The contents received inside the interior space or chamber are placed on one or more spacers 210 or risers. For example, a 0.5 inch spacer can be affixed to each of the four bottom corners of the interior of the device. The spacers are operable to create a small distance between the bottom of the contents placed inside the device and, for example, the lower radiant heater. The space created by the spacers 210 provides for air circulation around the container, which help regulate the total environment inside the device, as well as to prevent the bottom of any food item contained in the device from getting overcooked or overheated on a bottom surface were it to be touching the heater directly.

Figure 2E:
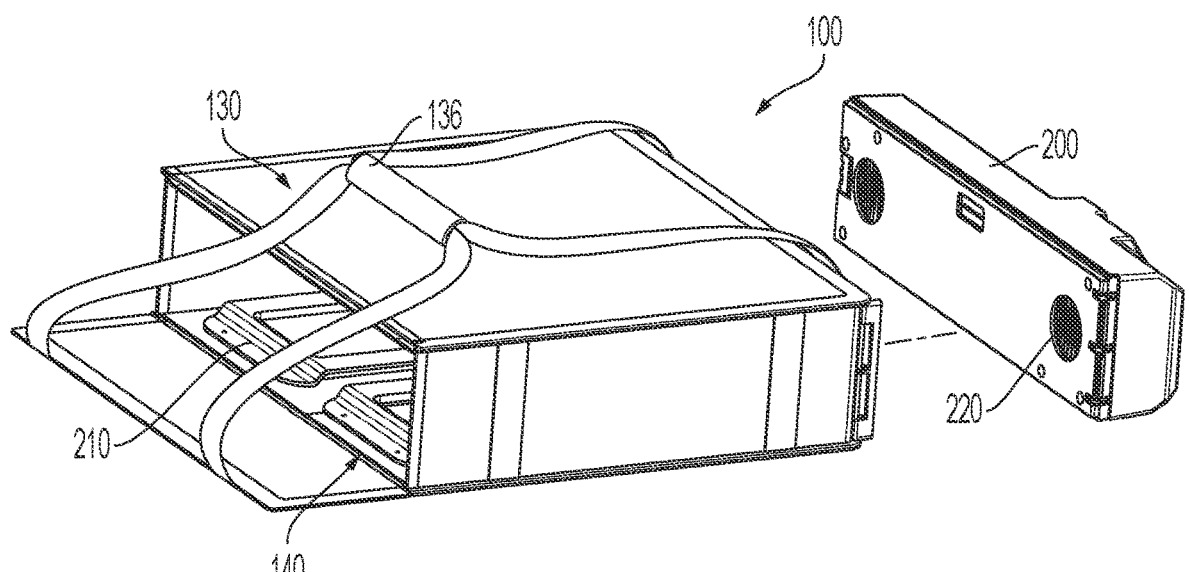

FIG. 2E illustrates a perspective view of the mobile environmental control device 100 with a food receiving side open and the controller 120 removed. FIG. 2E illustrates an interior view of the mobile environmental control device 100 with a food receiving side open. The interior surface of the controller interface 122 is shown. The engagement surface 122 can be a rigid or semi-rigid interface (e.g., a surface that has greater rigidity than other surfaces of the environment control device 100). Horizontal or vertical flaps 220 or louvers can be provided that are positioned over the intake and/or exhaust fans. The flaps are operable to prevent heat from escaping from the device when the fans are not turned on. When the fans are turned on, the flaps open slightly from the force of the fan and let air pass through. When the fans turn off, the flaps close and seal off the opening. The flaps can be made from any suitable material including silicone.

Figure 2F:
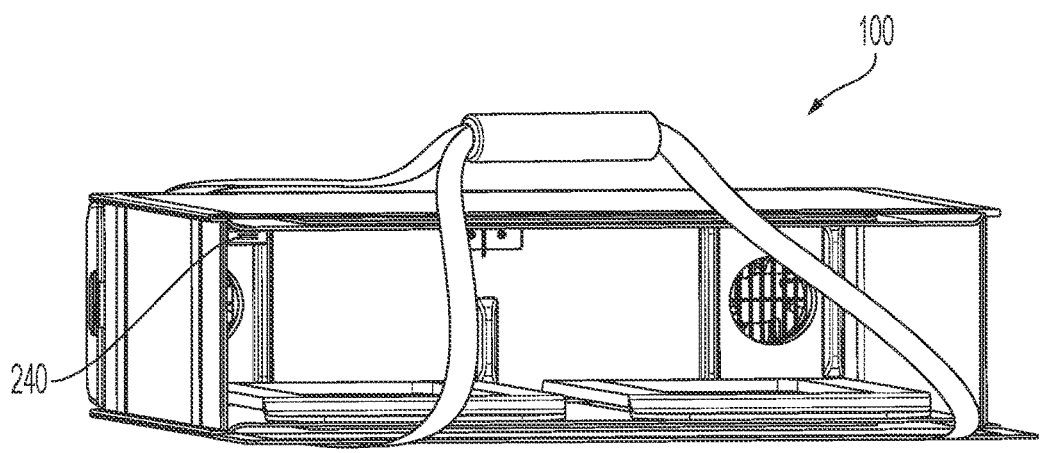

FIG. 2F illustrates a location for a sensor 240 positioned within the interior of the device 100.

In one embodiment, a first heater is located inside the device on an upper/top wall in a sleeve in a sleeve formed in the upper/top wall. A second heater is positioned in the bottom/lower wall of the device in a second sleeve. The heaters are operable to heat the device as well as maintaining the internal temperature of the device within a preset range while in transit.

The disclosed environmental control device 100 and systems have a plurality of features selected from: heating methods, air movement control methods, moisture control methods, atmospheric pressure, and software control features. Target parameters for temperature, air movement, pressure, and moisture can be set or adjusted based on the contents of the container. Adjusting the parameters can occur real-time or nearly real-time.

Various heating methods can be employed. In one configuration, forced air is provided. Forced air can be achieved by, for example, blowing air from outside the container, over one or more heating elements or coils, into the interior of the container. Another configuration, a heating element or liner can be used. A heating element, such as a heating pad containing thermal coils, are inserted and/or built into the container. Once activated, the pads can heat the inside of the container. Still another embodiment includes the use of induction. Induction transfers electrical energy by induction from, for example, a coil of wire into a metal material, e.g., a ferromagnetic material. A high frequency alternating current is passed through the coil which then causes the ferromagnetic material to heat. A suitable induction method provides one or more metallic plates within the interior of the container. In another embodiment, thermal coils can be provided through a lining of the container. Thermal coils can, for example, be sown into one or more sides of a container, such as a bag.

A forced air heater and intake fan system can be provided. The forced air and intake fan system can be located on the rear of the device as part of the a hard-case enclosure that snaps onto the back of the device. The forced air heater can be a radiant heater attached to a fan that draws air into the device. The air passes over the heater, thereby delivering heated air into the device thereby heating the interior of the device. This heater is operable to heat up the device as well as to provide supplemental support for the radiant heaters when in transit. If the internal temperature of the device falls below a set bottom temperature threshold, the intake fan and heater can be activated to help return the internal temperature to within the preset range more quickly than would be achievable by the radiant heaters alone.

Control of air movement within the interior of the environment control device 100 can be achieved in a variety of ways. One or more exhaust fans can be provided that are in communication with one or more sensors, such as temperature or humidity sensors. Exhaust fans can also be linked to sensors and a small internal fan and be configured for controlling air movement. This configuration could run continuously, whereas use of a humidity sensor could result in a configuration which intermittently operates in response to the humidity. Continuous air movement can be used to prevent moisture from settling onto dry or crispy parts of food. Power savings may result due to lower power required to control a fan than a heater. A pump-based system might also be employed. A pump-based system can be configured to move air out of a container interior in bursts. As moisture content reaches an upper limit, for example, the pump could engage and burp a blast of air out of an exhaust, removing the air from the interior of the container.

The exhaust fan can be located at the rear of the device on a side of the hard case enclosure from the intake fan/heater. The exhaust fan is operable to regulate the moisture content of the air inside the device during transit. If the humidity level inside the device increases beyond a preset limit, the exhaust fan turns on and evacuates the moist air from the interior of the device. Once the humidity level drops back to within a set range, the exhaust fan turns off.

A moisture control function can be achieved using a variety of techniques. Fans can be linked to one or more sensors that turn-on or turn-off based on a moisture content in the container that is detected by the sensors. Fans can then either push air out of the container or pull air into the container based on the detected moisture content and the target moisture content, i.e., based on whether the detected moisture content is higher or lower than the target moisture content.

Figure 3:
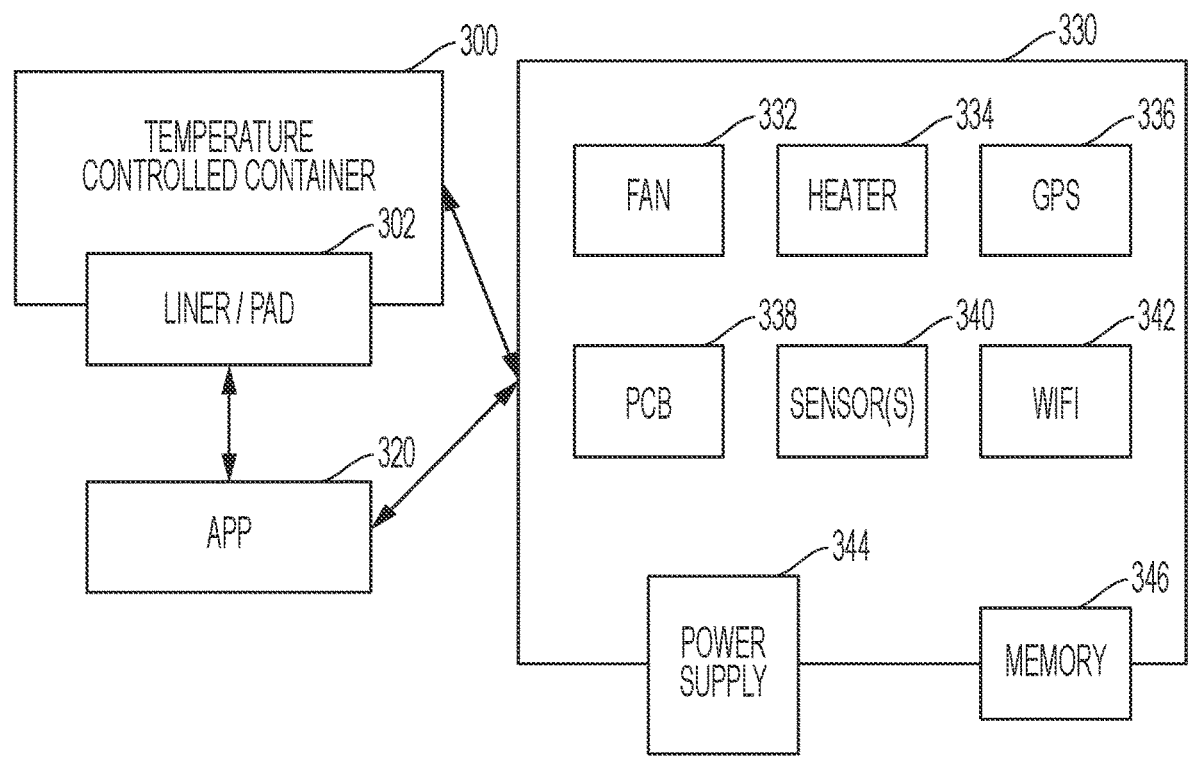
FIG. 3 illustrates a mobile environmental control device system.

Turning now to FIG. 3, a mobile environmental control device system is illustrated. The system has a temperature controlled container 300 which can include a liner or pad 302. The liner or pad 302 can be removable. The temperature controlled container 300 can be in communication with an app 320, such as a software application installed on a mobile device such as a cell phone. Either or both of the temperature controlled container 300 and the app 320 can be in communication with a controller 330. The controller 330 can be removable as illustrated in FIGS. 1-2. The temperature can be a target temperature, or temperature range, chosen based on the contents being transported. For example, if a pizza is being transported it is desirable to maintain the temperature of the environment between 175-200° F. In some cases, it may be desirable to include a time component to the environmental controls such that the temperature, for example, is maintained between 175-200° F. for 1 hour. It may also be desirable to pre-heat the container prior to inserting the content to be delivered. In such case, either the app or the environmental controller may be configured to indicate a ready status that reflects target environmental parameters, including the initial moisture content and moisture migration which is a critical component of the quality of food.

The environmental controller 330 can be configured to include one or more of a fan 332, a heater 334, a GPS monitor 336, a printed circuit board ("PCB") 338, one or more sensors 340, a WiFi transceiver 342, a power supply 344 and/or a memory 346. The PCB is operable to control the operation of the sensors, fans, heaters, and/or communication hardware. In another configuration, short-range wireless technology can be used to exchange data. Suitable short-range wireless technology is a Bluetooth®. The Bluetooth transmitter can be provided to communicate instructions to and from the environmental control device via a mobile device in a short range proximity between the environmental control device and the mobile device in response to one or more sensor readings. The Bluetooth transmitter can also transmit data including, but not limited to, temperature, humidity, GPS location, time, G-force shocks, battery status, etc. The Bluetooth transmitter can connect to a central location via, for example, an app on the mobile device.

A GPS tracker or transponder can be provided. The GPS tracker or transponder can be enclosed within the device and/or the environmental controller and is operable to transmit the location data of the device via the Bluetooth or cellular transmitters. The GPS information allows for real time tracking of the location of each device in a network of devices.

A cellular transmitter can also be provided. The cellular transmitter is operable for the same purpose as the Bluetooth transmitter and can function when a Bluetooth device is unavailable.

Sensors can include temperature sensors, moisture sensors, humidity sensors, oxygen sensors, air quality sensors, smoke sensors, etc. Additionally, in some configurations, the sensor environmental controller 330 can be in communication with the sensors, where the sensors are not part of the environmental controller.

Sensor placement can vary depending on the implementation. Suitable placement includes providing sensors as part of a hard case enclosure at the rear of the device. The sensors are configurable to take constant readings, or readings at specified time intervals, and transmits the readings to the PCB, which engages and disengages the heaters and fans as dictated by the humidity and temperature settings.

Other components can be provided without departing from the scope of the disclosure including, for example, a moisture controller and a timer. Components, such as the power supply 344 and the memory 346 can be removable from the environmental controller 330. The power supply 344 can be any suitable power supply, or combination of power supplies, including for example, solar cells, batteries, rechargeable batteries, USB connector, AC power cord connector, cigarette lighter socket, etc. Sensors can include, for example, weight, moisture, humidity, temperature, atmospheric pressure, G-force, location, rotation, low battery, etc.

II. Methods

One or more fans can be mounted on one or more heating elements to force heated air over the contents of the environmental control device 100. The PCB 338 is configurable to control the one or more heating elements 334 and the one or more fans 332 based on a feedback from, for example, a moisture sensor and/or a heat sensor. The sensors 340 can be part of the environmental controller 120 or incorporated into another surface of the container, e.g. at a location away from the one or more fans and one or more heaters, to ensure that the farthest locations within the container have a heat and/or humidity that is desired. Where a thermal pad or line is used, the thermal pad or liner can provide heat to the interior of the bag. The heat delivered by the thermal pad or line can still be controllable by the environmental controller 120.

An app 320 can be used to monitor the conditions within the environment control device 100 and/or control the environment within the container without opening the container. The app can also be used to alert of a malfunction or environment change. Thus, the app 320 can be used, for example, to control and/or monitor temperature and moisture settings, monitor power levels and/or battery usage, and the like. Additionally, it may be desirable to monitor G forces. Monitoring the G force can, for example, be used to prevent delivering a damaged item to the purchaser. The app can be used on any suitable electronic device including cell phones and tablets.

In some configurations, the app 320 that controls the conditions within the container can be part of a secondary device, such as a mobile phone, or it can be part of an integrated interface accessible to the user on the outside of the container.

Additionally, one or more displays can be provided which enable a user to determine an on/off condition for the container and/or a power supply status (e.g. battery level, power source plugged in, charging status, etc.). The app or software product can also transmit its location and internal settings, as well as external conditions, via mobile connection to a cloud controller which is configured to monitor one or more mobile devices.

III. Systems

A software app interfacing, monitoring and/or controlling the system can be configured to achieve a variety functions. For example, the software app can track and log delivery times and distances, and track and lock an internal temperature at various times throughout the delivery process (e.g., a start, at delivery and/or at times during the delivery process). A dashboard can be provided that allows the operator/owner to see a location, settings, and/or conditions of the container.

Settings may also be changed remotely via the app. Settings that can be changed or monitored can include, for example, on/off, temperature, moisture content, accelerometer readings, and battery life. Additionally, the app can be configured to "sleep" (or hibernate) if there has been no activity for a period of time, or to "wake" when movement is sensed.

In engaging the systems and methods according to aspects of the disclosed subject matter a user may engage in one or more use sessions. A use session may include a training session for the user.

Any of the disclosed methods can be implemented or partially implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any device capable of a computing function that includes computing hardware). As will be appreciated by those skilled in the art, computer-readable storage media does not include communication connections, such as modulated data signals. Any of the computer-executable instructions for implementing the disclosed techniques, as well as any data created and used during implementation of the disclosed embodiments, can be stored on one or more computer-readable media (e.g., non-transitory computer-readable media, which excludes propagated signals). Additionally, the computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

Only selected aspects of the software-based implementations are described. Other details that are well known in the art are omitted. For example, it should be understood that the disclosed technology is not limited to any specific computer language or program. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the internet, the world wide web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at times be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

As will be appreciated by those skilled in the art, the systems and methods disclosed are configurable to send a variety of messages when alerts are generated. Messages include, for example, SMS and email.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the claims define the scope of the invention and that methods and structures within the scope of these claims and their equivalents be covered thereby.

What is claimed:

1. A portable container comprising:
a soft-sided enclosure having an openable section, the openable section operable to move from an open position, for receiving a container, and a closed position;
an environmental control module operable to engage an environmental control module interface surface;
a humidity sensor;
a temperature sensor
one or more exhaust fans in communication with the humidity sensor and the temperature sensor;
one or more environmental controllers operable to control the one or more exhaust fans in response to a sensed humidity parameter from the humidity sensor and a sensed temperature parameter from the temperature sensor; and
a power supply.

2. The portable container of claim 1, wherein the soft-sided enclosure has a three-dimensional shape selected from a cube, a cuboid, a pyramid, a cone, a triangular prism, and a cylinder.

3. The portable container of claim 1, further comprising one or more environmental sensors selected from moisture sensors, atmospheric pressure sensors, oxygen sensors, air quality sensors, smoke sensors.

4. The portable container of claim 3, wherein more than one of any of the environmental sensors can be provided.

5. The portable container of claim 3, wherein the one or more environmental sensors positioned within the portable container at a location away from the one or more environmental controllers.

6. The portable container of claim 1, wherein one or more of the temperature sensor and the humidity sensor are positioned within the portable container at a location away from the environmental controller.

7. The portable container of claim 1 further comprising a communication device for transmitting sensor information from one or more sensors and receiving environment control instructions in response to the transmitted sensor information.

8. The portable container of claim 1 further comprising one or more of a GPS sensor and a G-force sensor.

9. A transportation method comprising:
providing a portable container comprising a soft-sided enclosure having an openable section, the openable section operable to move from an open position, for receiving a container, and a closed position, an environmental control module operable to engage an environmental control module interface surface, a humidity sensor, a temperature sensor, one or more exhaust fans in communication with the humidity sensor and the temperature sensor, one or more environmental controllers operable to control the one or more exhaust fans in response to a sensed humidity parameter from the humidity sensor and a sensed temperature parameter from the temperature sensor, and a power supply;
opening the soft-sided enclosure;
placing a food container within the soft-sided enclosure for transport;
closing the soft-sided enclosure;
configuring the environmental control module to maintain an environment within the soft-sided enclosure based on an identification of food within the food container; and
transporting the soft-sided enclosure.

10. The transportation method of claim 9 further comprising determining a GPS location for the soft-sided enclosure.

11. The transportation method of claim 9 further comprising determining a G-force for the soft-sided enclosure.

12. The transportation method of claim 9 further comprising the step of determining if the soft-sided enclosure has maintained one or more environmental conditions during transport, and if the portable container has maintained the one or more environmental conditions, delivering the food container.

13. The transportation method of claim 9 further comprising the step of determining if the soft-sided enclosure has been subjected to any G-force during transport, and if the portable container has not been subjected to any G-force, delivering the food container.

14. The transportation method of claim 9 further comprising the step of determining if the soft-sided enclosure has been subjected to any G-force during transport, and if the soft-sided enclosure has been subjected to any G-force, determining whether the G-force is within a predetermined range of allowable G-force, and if the G-force is within the predetermined range of allowable G-force, delivering the food container.

* * * * *